US012600362B2

(12) United States Patent
Ogawa

(10) Patent No.: US 12,600,362 B2
(45) Date of Patent: Apr. 14, 2026

(54) DIAGNOSIS APPARATUS

(71) Applicant: SUBARU CORPORATION, Tokyo (JP)

(72) Inventor: Hideki Ogawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 72 days.

(21) Appl. No.: 18/560,824

(22) PCT Filed: Mar. 30, 2022

(86) PCT No.: PCT/JP2022/016062
§ 371 (c)(1),
(2) Date: Nov. 14, 2023

(87) PCT Pub. No.: WO2023/188130
PCT Pub. Date: Oct. 5, 2023

(65) Prior Publication Data
US 2024/0253643 A1 Aug. 1, 2024

(51) Int. Cl.
*B60W 40/08* (2012.01)
*B60W 50/14* (2020.01)

(52) U.S. Cl.
CPC ............ *B60W 40/08* (2013.01); *B60W 50/14* (2013.01); *B60W 2040/0827* (2013.01); *B60W 2050/143* (2013.01); *B60W 2050/146* (2013.01); *B60W 2540/221* (2020.02); *B60W 2540/229* (2020.02); *B60W 2552/30* (2020.02); *B60W 2556/45* (2020.02)

(58) Field of Classification Search
CPC .. B60W 40/08; B60W 50/14; B60W 2556/45; B60W 2540/229; B60W 2552/30; B60W 2540/221; B60W 2040/0827; B60W 2050/143; B60W 2050/146
USPC ........................................................ 340/576
See application file for complete search history.

(56) References Cited

U.S. PATENT DOCUMENTS 7,027,621 B1 * 4/2006 Prokoski .............. G06V 40/165
340/576
10,503,988 B2 12/2019 Cordell
(Continued)

FOREIGN PATENT DOCUMENTS

CA 2649731 A1 * 5/2010 ........... A61B 5/6887
EP 1860354 A1 11/2007
(Continued)

OTHER PUBLICATIONS

International Search Report received in International Application No. PCT/JP2022/016062, dated Jun. 14, 2022.
(Continued)

*Primary Examiner* — Naomi J Small
(74) *Attorney, Agent, or Firm* — Rimon P.C.

(57) ABSTRACT

A diagnosis apparatus according to an embodiment of the disclosure includes a recognition unit and a diagnosis unit. The recognition unit is configured to recognize an environment outside a vehicle. The diagnosis unit is configured to detect a reaction time of a driver to a recognition target recognized by the recognition unit, based on a driving operation timing in a driving operation unit configured to receive a driving operation of the driver related to traveling of the vehicle, and diagnose a health state of the driver based on the reaction time.

13 Claims, 10 Drawing Sheets

(56) References Cited

U.S. PATENT DOCUMENTS

| | | | |
|---|---|---|---|
| 10,977,882 B1 | 4/2021 | Nguyen | |
| 2008/0228046 A1 | 9/2008 | Futatsuyama | |
| 2012/0105234 A1 | 5/2012 | Oguri | |
| 2013/0190944 A1* | 7/2013 | Brandin | G01C 21/26 |
| | | | 701/1 |
| 2016/0071418 A1* | 3/2016 | Oshida | B60W 30/165 |
| | | | 701/23 |
| 2017/0106873 A1* | 4/2017 | Fung | G01S 19/13 |
| 2018/0186373 A1* | 7/2018 | Liu | B60W 30/143 |
| 2019/0092337 A1* | 3/2019 | Chua | B60W 30/14 |
| 2021/0107494 A1* | 4/2021 | Silver | B60Q 9/008 |
| 2021/0369656 A1* | 12/2021 | Clouatre | A61P 25/28 |

FOREIGN PATENT DOCUMENTS

| | | | |
|---|---|---|---|
| JP | 47-40985 A | 12/1972 | |
| JP | 2007-315535 A | 12/2007 | |
| JP | 2008-234009 A | 10/2008 | |
| JP | 2009-002891 A | 1/2009 | |
| JP | 2011-018240 A | 1/2011 | |
| JP | 4797284 B2 * | 10/2011 | |
| JP | 2015-141536 A | 8/2015 | |
| JP | 2016-091056 A | 5/2016 | |
| JP | 2018-135002 A | 8/2018 | |
| JP | 2019-525185 A | 9/2019 | |

OTHER PUBLICATIONS

Office Action dated Jun. 25, 2024, from corresponding JP Application No. 2023-519103, 6 pages.

* cited by examiner

DIAGNOSIS APPARATUS

TECHNICAL FIELD

The disclosure relates to a diagnosis apparatus that diagnoses a health state of a driver.

BACKGROUND ART

A technique that assists health management of an occupant has been developed for vehicles. For example, Patent Literature 1 discloses a technique of detecting biometric information such as a heart rate or a blood pressure of an occupant, and advising the occupant based on a result of the detection.

CITATION LIST

Patent Literature

Patent Literature 1: Japanese Unexamined Patent Application Publication No. 2008-234009

SUMMARY OF INVENTION

It is desired to make it possible to diagnose a health state of a driver in a vehicle, and an improvement in diagnosis accuracy of the health state is expected.

It is desirable to provide a diagnosis apparatus that makes it possible to diagnose a health state of a driver.

A diagnosis apparatus according to one embodiment of the disclosure includes a recognition unit and a diagnosis unit. The recognition unit is configured to recognize an environment outside a vehicle. The diagnosis unit is configured to detect a reaction time of a driver to a recognition target recognized by the vehicle external environment recognition unit, based on a driving operation timing in a driving operation unit configured to receive a driving operation of the driver related to traveling of the vehicle, and diagnose a health state of the driver based on the reaction time.

The diagnosis apparatus according to one embodiment of the disclosure makes it possible to diagnose the health state of the driver.

MODES FOR CARRYING OUT THE INVENTION

In the following, some embodiments of the disclosure are described in detail with reference to the accompanying drawings.

EMBODIMENTS

Configuration Example

Figure 1:
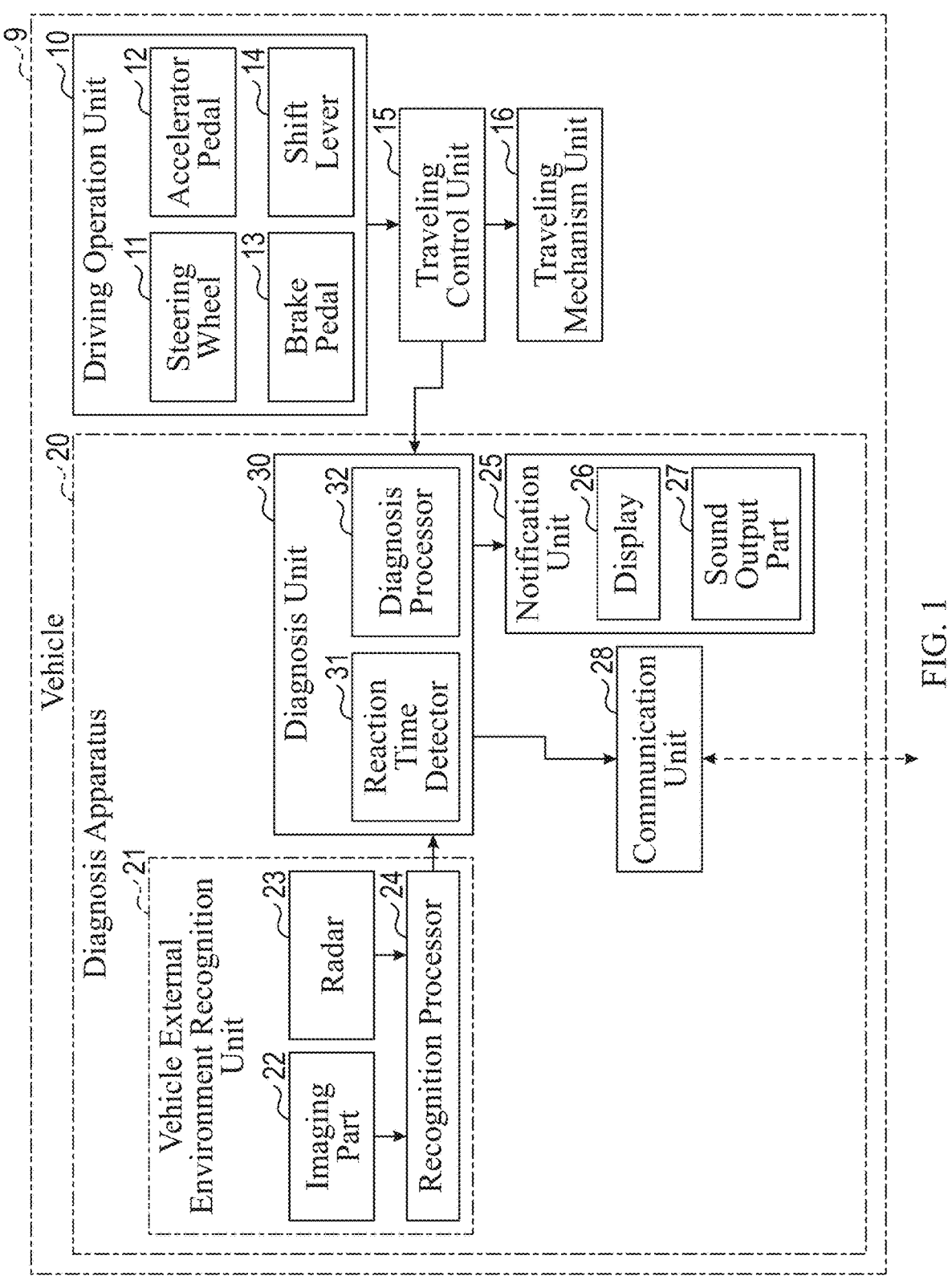
FIG. 1 is a block diagram illustrating a configuration example of a vehicle including a diagnosis apparatus according to one embodiment of the disclosure.

FIG. 1 illustrates a configuration example of a vehicle 9 including a diagnosis apparatus according to an embodiment. The vehicle 9 includes a driving operation unit 10, a traveling control unit 15, a traveling mechanism unit 16, and a diagnosis apparatus 20.

The driving operation unit 10 is configured to receive a driving operation performed by a driver. The driving operation unit 10 includes a steering wheel 11, an accelerator pedal 12, a brake pedal 13, and a shift lever 14. The steering wheel 11 is configured to receive a steering operation performed by the driver. The accelerator pedal 12 is configured to receive an accelerating operation performed by the driver. The brake pedal 13 is configured to receive a braking operation performed by the driver. The shift lever 14 is configured to receive a shifting operation performed on a transmission mechanism by the driver. In addition, the driving operation unit 10 further includes, for example, a turn signal lever and a parking brake pedal.

The traveling control unit 15 is configured to control traveling of the vehicle 9, by controlling operation of the traveling mechanism unit 16 based on the driver's driving operation received by the driving operation unit 10. The traveling control unit 15 includes, for example, one or more electronic control units (ECUs). In addition, the traveling control unit 15 supplies information regarding the driving operation received by the driving operation unit 10 to the diagnosis apparatus 20.

The traveling mechanism unit 16 includes, for example, an engine, the transmission mechanism, a steering mechanism, a braking mechanism, and wheels. The traveling mechanism unit 16 is configured to operate based on a command from the traveling control unit 15. Operating the traveling mechanism unit 16 causes the vehicle 9 to travel in accordance with the driver's driving operation received by the driving operation unit 10.

The diagnosis apparatus 20 is configured to diagnose a health state of the driver of the vehicle 9. The diagnosis apparatus 20 includes a vehicle external environment recognition unit 21, a diagnosis unit 30, a notification unit 25, and a communication unit 28.

The vehicle external environment recognition unit 21 is configured to recognize, for example, an environment around the vehicle 9, such as a traveling road on which the vehicle 9 is traveling or a preceding vehicle traveling in front of the vehicle 9. The vehicle external environment recognition unit 21 includes an imaging part 22, a radar 23, and a recognition processor 24. The imaging part 22 includes an image sensor, and is configured to, for example, capture an image of a region in front of the vehicle 9 at a predetermined frame rate. The imaging part 22 may include one image sensor, or include a so-called stereo camera including one pair of image sensors. The radar 23 is configured to detect a distance from the vehicle 9 to an object in front of the vehicle 9. The recognition processor 24 is configured to perform recognition processing of recognizing the environment around the vehicle 9, based on the image captured by the imaging part 22 and a result of detection by the radar 23. Further, the recognition processor 24 supplies information regarding the recognized vehicle external environment to the diagnosis unit 30.

The diagnosis unit 30 is configured to diagnose the health state of the driver of the vehicle 9, based on the information regarding the vehicle external environment supplied from the recognition processor 24 and the information regarding the driver's driving operation supplied from the traveling control unit 15. The diagnosis unit 30 includes, for example, one or more processors and one or more memories. The diagnosis unit 30 includes a reaction time detector 31 and a diagnosis processor 32.

The reaction time detector 31 is configured to detect a reaction time of the driver to a recognition target recognized by the vehicle external environment recognition unit 21. Specifically, the reaction time detector 31 detects the reaction time of the driver to the recognition target recognized by the vehicle external environment recognition unit 21, based on the information regarding the vehicle external environment supplied from the recognition processor 24 and the information regarding the driver's driving operation supplied from the traveling control unit 15.

The diagnosis processor 32 is configured to diagnose the health state of the driver of the vehicle 9, based on the reaction time detected by the reaction time detector 31. Specifically, the diagnosis processor 32 compares the reaction time with a threshold, and diagnose the health state of the driver based on a result of the comparison.

The notification unit 25 is configured to notify the driver or a passenger of information corresponding to a result of processing by the diagnosis processor 32. The notification unit 25 includes a display 26 and a sound output part 27. The display 26 is configured to display the information corresponding to the result of processing by the diagnosis processor 32. For example, the display 26 includes a liquid crystal display panel or an organic electroluminescence (EL) display panel. The sound output part 27 includes, for example, a speaker and an amplifier, and is configured to provide, via a sound such as a voice or an alert sound, notification of the information corresponding to the result of processing by the diagnosis processor 32. The display 26 and the sound output part 27 may be a display and a sound output part included in an instrument panel of the vehicle 9, a display and a sound output part included in a navigation device, or a display and a sound output part dedicated to the diagnosis apparatus 20.

The communication unit 28 is configured to transmit information corresponding to the result of processing by the diagnosis processor 32 to an apparatus external to the vehicle 9. The communication unit 28 may, for example, perform communication via a wireless local area network (LAN), or perform communication via mobile phone communication such as Long Term Evolution (LTE) or 5G. The communication unit 28 transmits the information corresponding to the result of processing by the diagnosis processor 32 to, for example, a computer of a medical institution, or a computer or a smartphone of a family member of the driver.

Here, the vehicle external environment recognition unit 21 corresponds to a specific example of a "recognition unit" in the disclosure. The diagnosis unit 30 corresponds to a specific example of a "diagnosis unit" in the disclosure. The notification unit 25 corresponds to a specific example of a "notification unit" in the disclosure. The communication unit 28 corresponds to a specific example of a "communication unit" in the disclosure.

Operations and Workings

Next, operations and workings of the diagnosis apparatus 20 according to this embodiment are described.
(Outline of Overall Operation)

First, operation of the vehicle 9 is described with reference to FIG. 1. The driving operation unit 10 receives a driving operation performed by the driver. The traveling control unit 15 controls traveling of the vehicle 9, by controlling the operation of the traveling mechanism unit 16 based on the driver's driving operation received by the driving operation unit 10. The traveling mechanism unit 16 operates based on a command from the traveling control unit 15. Operating the traveling mechanism unit 16 causes the vehicle 9 to travel in accordance with the driver's driving operation received by the driving operation unit 10.

In the diagnosis apparatus 20, the vehicle external environment recognition unit 21 recognizes, for example, the environment around the vehicle 9, such as a traveling road on which the vehicle 9 is traveling or a preceding vehicle traveling in front of the vehicle 9. The reaction time detector 31 of the diagnosis unit 30 detects a reaction time of the driver to a recognition target recognized by the vehicle external environment recognition unit 21. The diagnosis processor 32 diagnoses the health state of the driver of the vehicle 9, based on the reaction time detected by the reaction time detector 31. The notification unit 25 notifies the driver or the passenger of information corresponding to the result of processing by the diagnosis processor 32. The communication unit 28 transmits data corresponding to the result of processing by the diagnosis processor 32 to an apparatus external to the vehicle 9.
(Detailed Operation)

Detection of the reaction time in the diagnosis apparatus 20 is described in detail below, with reference to some examples.

Figure 2:
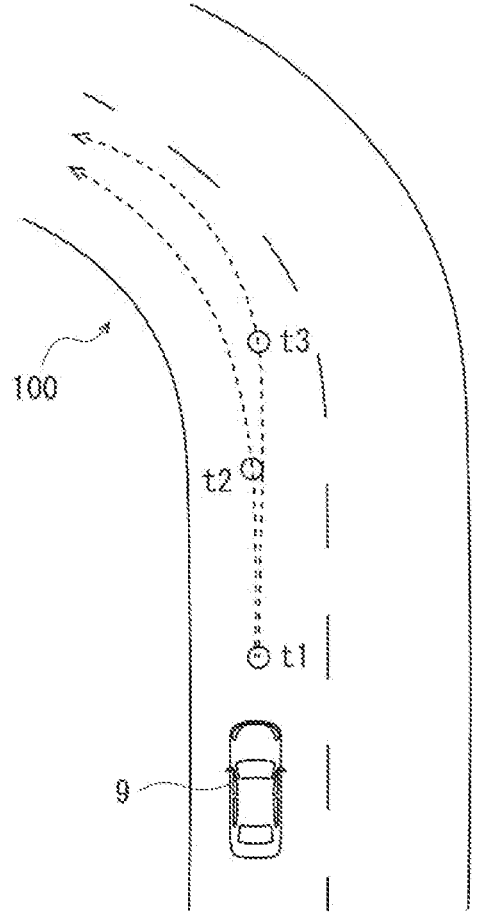
FIG. 2 is an explanatory diagram illustrating an operation example of the diagnosis apparatus illustrated in FIG. 1.

FIG. 2 illustrates an example of the operation of detecting the reaction time. On the traveling road of the vehicle 9, a left-hand curve 100 is present in front of the vehicle 9. The imaging part 22 of the vehicle 9 captures an image of a region in front of the vehicle 9, and the radar 23 detects a distance from the vehicle 9 to the object in front of the vehicle 9. The recognition processor 24 recognizes the curve 100, based on the image captured by the imaging part 22 and the result of detection by the radar 23, and supplies information indicating that the curve 100 is present in front of the vehicle 9 to the diagnosis unit 30, together with information regarding the distance from the vehicle 9 to the curve 100. The reaction time detector 31 of the diagnosis unit 30 sets, for example, a timing t1 when the vehicle 9 reaches a location before the curve 100 by a predetermined distance, as a reference timing, and detects the reaction time from the timing t1 to a timing at which the driver starts to operate the steering wheel 11.

The driver has to make a quick determination at a curve. For example, when the driver recognizes the curve 100 early, and starts to operate the steering wheel 11 at an early timing t2 for the curve 100, the vehicle 9 is able to travel with a margin within a lane on the traveling road. In contrast, when the timing at which the driver recognizes the curve 100 is delayed, and the driver starts to operate the steering wheel 11 at a late timing t3 for the curve 100, the vehicle 9 can travel, for example, with its vehicle body partly out of the lane.

In this example, the reaction time detector 31 detects, as the reaction time of the driver, a time from the timing t1 serving as the reference timing to the timing t2 or t3 when the driver stars to operate the steering wheel 11. The diagnosis processor 32 compares, for example, the reaction time with a predetermined threshold, and diagnoses the health state of the driver based on a result of the comparison. For example, when the reaction time of the driver is longer than the predetermined threshold, the diagnosis processor 32 determines that the driver is likely to be in a poor health state.

Note that the recognition processor 24 recognizes the curve 100 in front of the vehicle 9 based on the image captured by the imaging part 22 in this example, but this is non-limiting. For example, when the vehicle external environment recognition unit includes a navigation device that detects a position of the vehicle 9 based on map data, and vehicle position data obtained by a global navigation satellite system (GNSS) receiver, the curve 100 may be recognized using the map data. Also in this case, the reaction time detector 31 is able to detect the reaction time of the driver, and the diagnosis processor 32 is able to diagnose the health state of the driver based on the reaction time.

Figure 3:
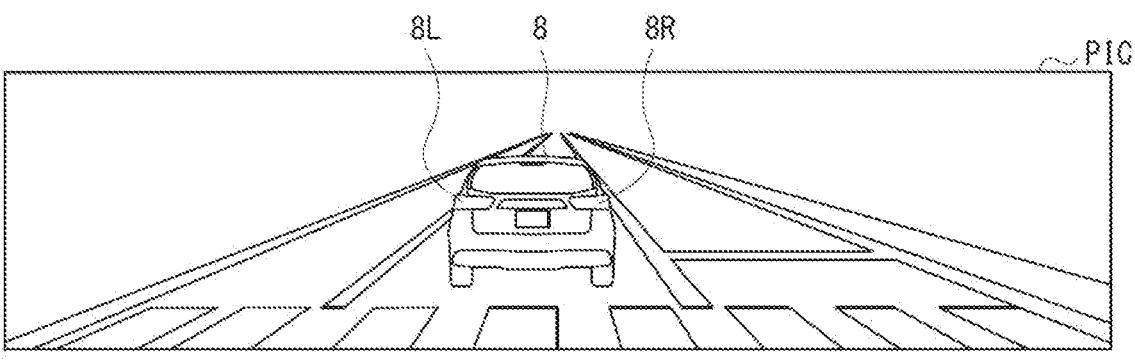
FIG. 3 is an explanatory diagram illustrating another operation example of the diagnosis apparatus illustrated in FIG. 1.

FIG. 3 illustrates another example of the operation of detecting the reaction time, and illustrates an example of a captured image PIC obtained by the imaging part 22. On the traveling road of the vehicle 9, a preceding vehicle 8 is traveling in front of the vehicle 9. The imaging part 22 of the vehicle 9 captures an image of a region in front of the vehicle 9 to generate such a captured image PIC, and the radar 23 detects a distance from the vehicle 9 to the object in front of the vehicle 9. The recognition processor 24 recognizes the preceding vehicle 8 based on the captured image PIC and the result of detection by the radar 23, and supplies information indicating that the preceding vehicle 8 is traveling in front of the vehicle 9 to the diagnosis unit 30, together with information regarding the distance from the vehicle 9 to the preceding vehicle 8. The recognition processor 24 also detects whether brake lamps 8L and 8R of the preceding vehicle 8 are lit to unlit, and also supplies information regarding a result of the detection to the diagnosis unit 30. In a case where the distance from the vehicle 9 to the preceding vehicle 8 is within a predetermined distance, when the brake lamps 8L and 8R of the preceding vehicle 8 are lit, for example, the reaction time detector 31 of the diagnosis unit 30 sets the lighting timing as a reference timing, and detects the reaction time from the lighting timing to a timing at which the driver starts to depress the brake pedal 13.

In a case where an inter-vehicle distance between the vehicle 9 and the preceding vehicle 8 is short, when the preceding vehicle 8 decelerates, the driver has to make a quick determination. For example, when the driver starts to depress the brake pedal 13 immediately after the brake lamps 8L and 8R of the preceding vehicle 8 are lit, the vehicle 9 is able to keep the inter-vehicle distance between the vehicle 9 and the preceding vehicle 8 to some extent. In contrast, when the timing at which the driver recognizes the lighting of the brake lamps 8L and 8R of the preceding vehicle 8 is delayed, and the driver starts to depress the brake pedal 13 at a late timing, the vehicle 9 can get too close to the preceding vehicle 8.

In this example, the reaction time detector 31 detects, as the reaction time of the driver, a time from the lighting timing of the brake lamps 8L and 8R serving as the reference timing to the timing at which the driver starts to depress the brake pedal 13. The diagnosis processor 32 compares, for example, the reaction time with a predetermined threshold, and diagnoses the health state of the driver based on a result of the comparison. For example, when the reaction time of the driver is longer than the predetermined threshold, the diagnosis processor 32 determines that the driver is likely to be in a poor health state.

In this example, the reaction time detector 31 detects the reaction time of a steering operation to the curve in front of the vehicle 9 (the example of FIG. 2), or the reaction time of a braking operation to deceleration of the preceding vehicle (the example of FIG. 3), but this is non-limiting. The reaction time detector 31 may detect the reaction time when, for example, a person or a bicycle suddenly comes out from a place out of the driver's sight, such as an alley. The reaction time detector 31 may detect any reaction time, as long as the reaction time is related to a driving operation for which the driver has to make a quick determination.

As described above, in the diagnosis unit 30, the reaction time detector 31 detects the reaction time of the driver to the recognition target recognized by the vehicle external environment recognition unit 21, and the diagnosis processor 32 diagnoses the health state of the driver of the vehicle 9, based on the reaction time detected by the reaction time detector 31. In other words, in a poor health state, the driver can be unable to make a quick determination. For example, when the driver has a disease such as a minor cerebrovascular disease, the driver can be unable to make a quick determination, resulting in a long reaction time. Such a disease can be difficult to diagnose based on ordinary biometric information such as a heart rate or a blood pressure, but can be easy to diagnose based on a delay in reaction. Hence, the diagnosis processor 32 determines the health state of the driver based on such a reaction time.

Figure 4:
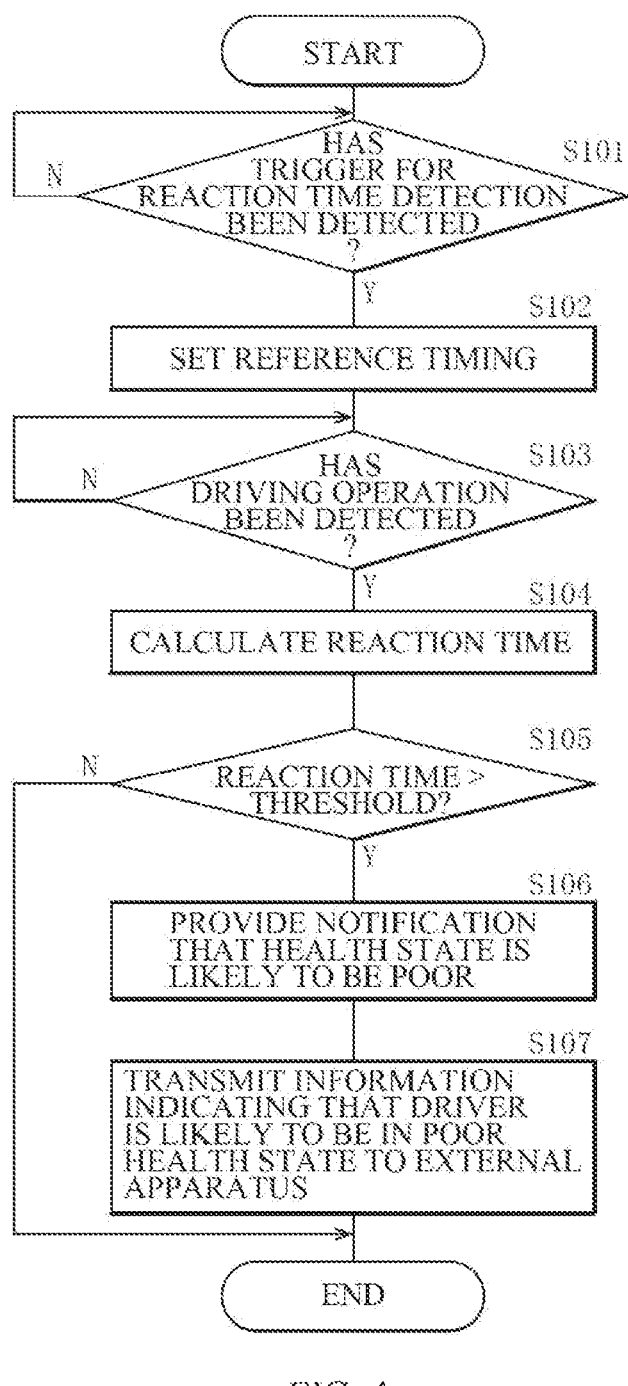
FIG. 4 is a flowchart illustrating an operation example of the diagnosis apparatus illustrated in FIG. 1.

FIG. 4 illustrates an operation example of the diagnosis apparatus 20.

First, the diagnosis unit 30 checks whether a trigger for reaction time detection has been detected, based on the information regarding the vehicle external environment supplied from the recognition processor 24 (step S101). Specifically, in the example of FIG. 2, the diagnosis unit 30 checks whether the curve 100 is present in front of the vehicle 9, and the vehicle 9 has reached the location before the curve 100 by the predetermined distance. In the example of FIG. 3, the diagnosis unit 30 checks whether the preceding vehicle 8 is traveling in front of the vehicle 9, and the brake lamps 8L and 8R of the preceding vehicle 8 have been lit. If no trigger for reaction time detection has been detected ("N" in step S101), the diagnosis unit 30 repeats step S101 until a trigger for reaction time detection is detected.

If a trigger for reaction time detection has been detected in step S101 ("Y" in step S101), the reaction time detector 31 of the diagnosis unit 30 sets a timing of the detection of the trigger for reaction time detection, as the reference timing (step S102).

Thereafter, the diagnosis unit 30 checks whether the driver's driving operation corresponding to the trigger for reaction time detection has been detected, based on the information regarding the driver's driving operation supplied from the traveling control unit 15 (step S103). Specifically, in the example of FIG. 2, the diagnosis unit 30 checks whether the driver has started to operate the steering wheel 11. In the example of FIG. 3, the diagnosis unit 30 checks whether the driver has started to deppress the brake pedal 13. If the driver's operation has not been detected ("N" in step S103), the diagnosis unit 30 repeats step S103 until the driver's driving operation is detected.

If the driver's driving operation has been detected in step S103 ("Y" in step S103), the reaction time detector 31 of the diagnosis unit 30 calculates the reaction time. Specifically, the reaction time detector 31 calculates, as the reaction time, a time from the reference timing set in step S102 to the timing of the driver's driving operation detected in step S103.

Thereafter, the diagnosis processor 32 of the diagnosis unit 30 checks whether the reaction time calculated in step S104 is longer than the threshold (step S105). If the reaction time is not longer than the threshold ("N" in step S105), this process ends.

If the reaction time is longer than the threshold in step S105 ("Y" in step S105), the diagnosis processor 32 determines that the driver is likely to be in a poor health state, and the notification unit 25 notifies the driver or the passenger that the driver is likely to be in a poor health state (step S106). This enables the driver to objectively grasp his/her own health state. Based on this notification, the driver is able to, for example, decide to avoid long-time driving or go to a medical institution for examination.

Further, the communication unit 28 transmits information indicating that the driver is likely to be in a poor health state to an external apparatus (step S107). Specifically, the communication unit 28 transmits the information indicating that the driver is likely to be in a poor health state to, for example, a computer or a smartphone of a family member of the driver. This enables the family member of the driver to grasp the health state of the driver, and to encourage the driver to avoid long-time driving or go to a medical institution for examination. In addition, the communication unit 28 transmits, for example, the information indicating that the driver is likely to be in a poor health state to a computer of a medical institution. This enables, for example, the medical institution to grasp the health state of the driver, and to encourange the driver to avoid long-time driving or be examined.

Thereafter, this process ends.

As described above, the diagnosis apparatus 20 is provided with the vehicle external environment recognition unit 21 and the diagnosis unit 30. The vehicle external environment recognition unit 21 recognizes the environment outside the vehicle 9. The diagnosis unit 30 detects a reaction time of the driver to a recognition target recognized by the vehicle external environment recognition unit 21, based on a driving operation timing in the driving operation unit 10 that receives the driver's driving operation related to traveling of the vehicle 9, and diagnoses the health state of the driver based on the reaction time. Thus, for example, even if the health state of the driver is difficult to diagnose based on ordinary biometric information such as a heart rate or a blood pressure, it is possible to diagnose the health state of the driver based on the reaction time of the driver.

The diagnosis apparatus 20 is provided with the notification unit 25 that notifies the driver of information. The diagnosis unit 30 diagnoses the health state by comparing the reaction time with a threshold. When the reaction time is longer than the threshold, the notification unit 25 notifies the driver of information corresponding to a result of comparison by the diagnosis unit 30. This enables the driver to objectively grasp his/her own health state and to, for example, decide to avoid long-time driving or go to a medical institution for examination.

The diagnosis apparatus 20 is provided with the communication unit 28 that performs communication with an external apparatus. The diagnosis unit 30 diagnoses the health state by comparing the reaction time with a threshold. When the reaction time is longer than the threshold, the communication unit transmits information corresponding to a result of diagnosis by the diagnosis unit 30 to the external apparatus. This enables, for example, a family member of the driver or a medical institution to grasp the health state of the driver, and to encourange the driver to avoid long-time driving or be examined.

Effects

As described above, in this embodiment, the vehicle external environment recognition unit and the diagnosis unit are provided. The vehicle external environment recognition unit recognizes the environment outside the vehicle. The diagnosis unit detects a reaction time of the driver to a recognition target recognized by the vehicle external environment recognition unit, based on a driving operation timing in the driving operation unit that receives the driver's driving operation related to traveling of the vehicle, and diagnoses the health state of the driver based on the reaction time. This makes it possible to diagnose the health state of the driver.

In this embodiment, the notification unit that notifies the driver of information is provided. The diagnosis unit diagnoses the health state by comparing the reaction time with a threshold. When the reaction time is longer than the threshold, the notification unit notifies the driver of information corresponding to a result of comparison by the diagnosis unit. This enables the driver to objectively grasp his/her own health state.

In this embodiment, a communication unit that performs communication with an external apparatus is provided. The diagnosis unit diagnoses the health state by comparing the reaction time with a threshold. When the reaction time is longer than the threshold, the communication unit transmits information corresponding to a result of diagnosis by the diagnosis unit 30 to the external apparatus. This enables, for example, a family member of the driver or a medical institution to grasp the health state of the driver.

Modification Example 1

In the embodiment described above, the diagnosis unit 30 determines the health state of the driver using the predetermined threshold, but this is non-limiting. Alternatively, information regarding the reaction time of the driver detected by the reaction time detector 31 may be accumulated, a threshold may be generated based on the accumulated information regarding the reaction time, and the health state of the driver may be diagnosed using the threshold. This modification example is described in detail below with reference to some examples.

Figure 5:
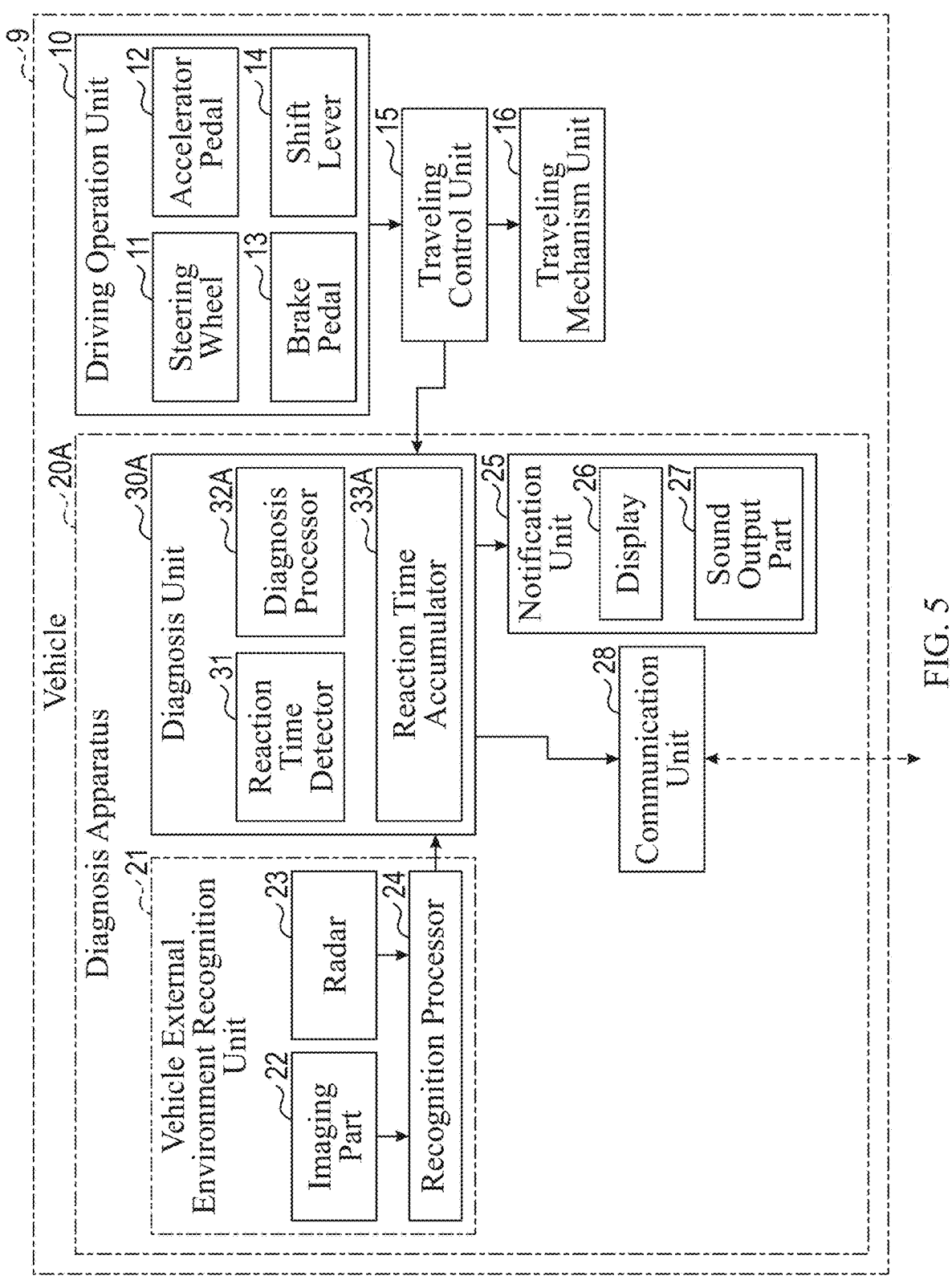
FIG. 5 is a block diagram illustrating a configuration example of a vehicle including a diagnosis apparatus according to a modification example.

FIG. 5 illustrates a configuration example of the vehicle 9 including a diagnosis apparatus 20A according to this modification example. The diagnosis apparatus 20A includes a diagnosis unit 30A. The diagnosis unit 30A includes the reaction time detector 31, a reaction time accumulator 33A, and a diagnosis processor 32A.

The reaction time accumulator 33A is configured to accumulate information regarding the reaction time detected by the reaction time detector 31. The reaction time accumulator 33A includes, for example, a nonvolatile memory. Here, the reaction time accumulator 33A corresponds to a specific example of a "memory" in the disclosure.

The diagnosis processor 32A is configured to generate a threshold based on the information regarding the reaction time accumulated in the reaction time accumulator 33A, and diagnose the health state of the driver by comparing the reaction time detected by the reaction time detector 31 with the threshold.

Figure 6:
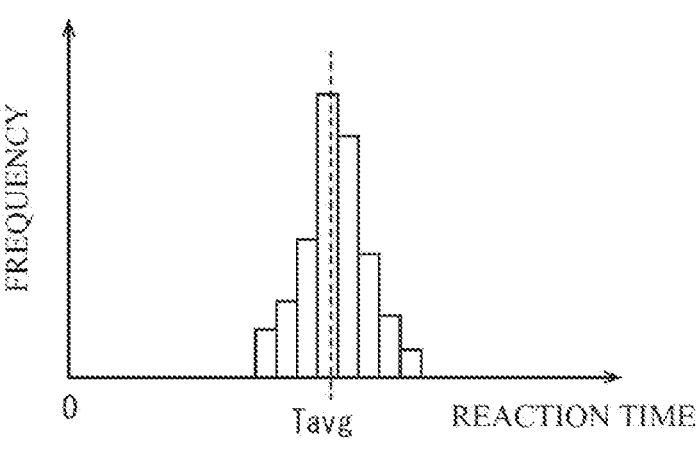
FIG. 6 is an explanatory diagram illustrating an operation example of a diagnosis processor illustrated in FIG. 5.

FIG. 6 illustrates a histogram of the reaction times accumulated in the reaction time accumulator 33A. The diagnosis processor 32A generates the threshold based on information regarding such distribution of the reaction time. Specifically, the diagnosis processor 32A may, for example, set an average value Tavg of the distribution of the reaction time as the threshold, or set a value somewhat greater than the average value Tavg as the average value.

As described above, in the diagnosis apparatus 20A, the diagnosis unit 30A includes a memory that accumulates the reaction time of the driver, and the diagnosis unit 30A generates a threshold based on the accumulated reaction times, and diagnoses the health state of the driver by comparing the reaction time with the threshold. This makes it possible to generate the threshold based on the past reaction time of the driver. Thus, for example, when the detected reaction time is longer than a usual reaction time of the driver, it is possible to determine that the driver is likely to be in a poor health state. Consequently, the diagnosis apparatus 20A makes it possible to enhance diagnosis accuracy of the health state.

Figure 7:
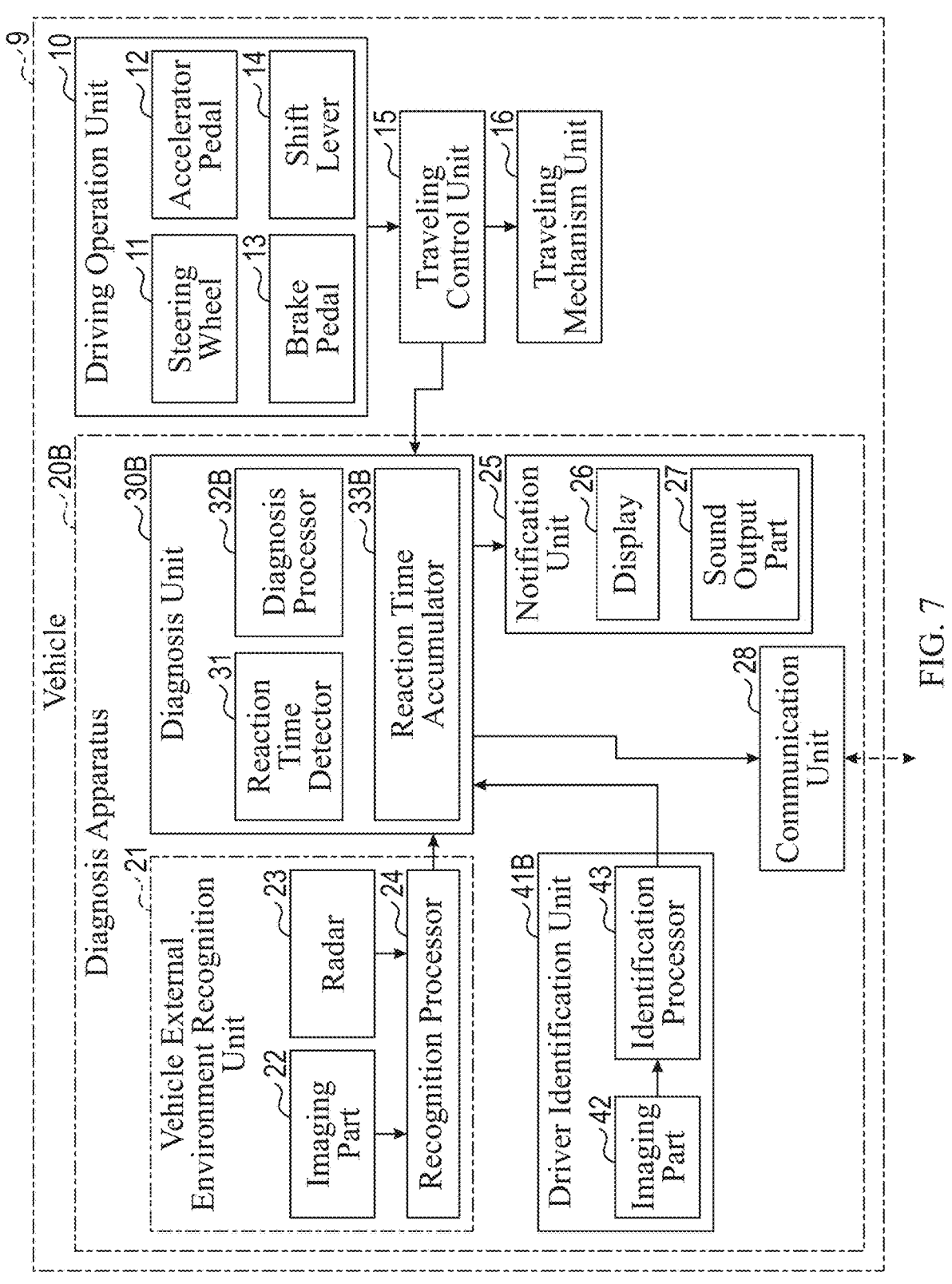
FIG. 7 is a block diagram illustrating a configuration example of a vehicle including a diagnosis apparatus according to another modification example.

FIG. 7 illustrates a configuration example of the vehicle 9 including another diagnosis apparatus 20B according to this modification example. The diagnosis apparatus 20B includes a driver identification unit 41B and a diagnosis unit 30B.

The driver identification unit 41B includes an imaging part 42 and an identification processor 43. The imaging part 42 includes an image sensor, and is configured to capture an image of the driver. The identification processor 43 is configured to identify the driver who drives the vehicle 9, based on a result of imaging by the imaging part 42. Further, the identification processor 43 supplies a result of identifying the driver to the diagnosis unit 30B.

Note that the driver identification unit 41B identifies the driver based on the image captured by the imaging part 42 in this example, but this is non-limiting. Alternatively, for example, the steering wheel may be provided with a fingerprint sensor, and the driver may be identified based on a result of detection by the fingerprint sensor.

The diagnosis unit 30B includes the reaction time detector 31, a reaction time accumulator 33B, and a diagnosis processor 32B.

The reaction time accumulator 33B is configured to accumulate information regarding the reaction time detected by the reaction time detector 31. The reaction time accumulator 33B individually accumulates the information regarding the reaction time for each of multiple drivers, based on the result of identification by the driver identification unit 41B. The reaction time accumulator 33A includes, for example, a nonvolatile memory.

The diagnosis processor 32B is configured to generate a threshold based on information regarding the reaction time related to the driver identified by the driver identification unit 41B, of the information regarding the reaction time accumulated in the reaction time accumulator 33B, and diagnose the health state of the driver by comparing the reaction time detected by the reaction time detector 31 with the threshold.

As described above, the diagnosis apparatus 20B is provided with the driver identification unit 41B that identifies the driver. Further, the diagnosis unit 30B includes a memory that individually accumulates the reaction time of each of multiple drivers based on the result of identification by the driver identification unit 41B. The diagnosis unit 30B generates a threshold based on the reaction time related to the driver identified by the driver identification unit 41B, of the accumulated reaction times, and diagnoses the health state of the driver by comparing the reaction time with the threshold. Thus, even if multiple drivers can drive the vehicle 9, it is possible to suppress influence of a difference between the individual drivers, which makes it possible to enhance the diagnosis accuracy of the health state.

Figure 8:
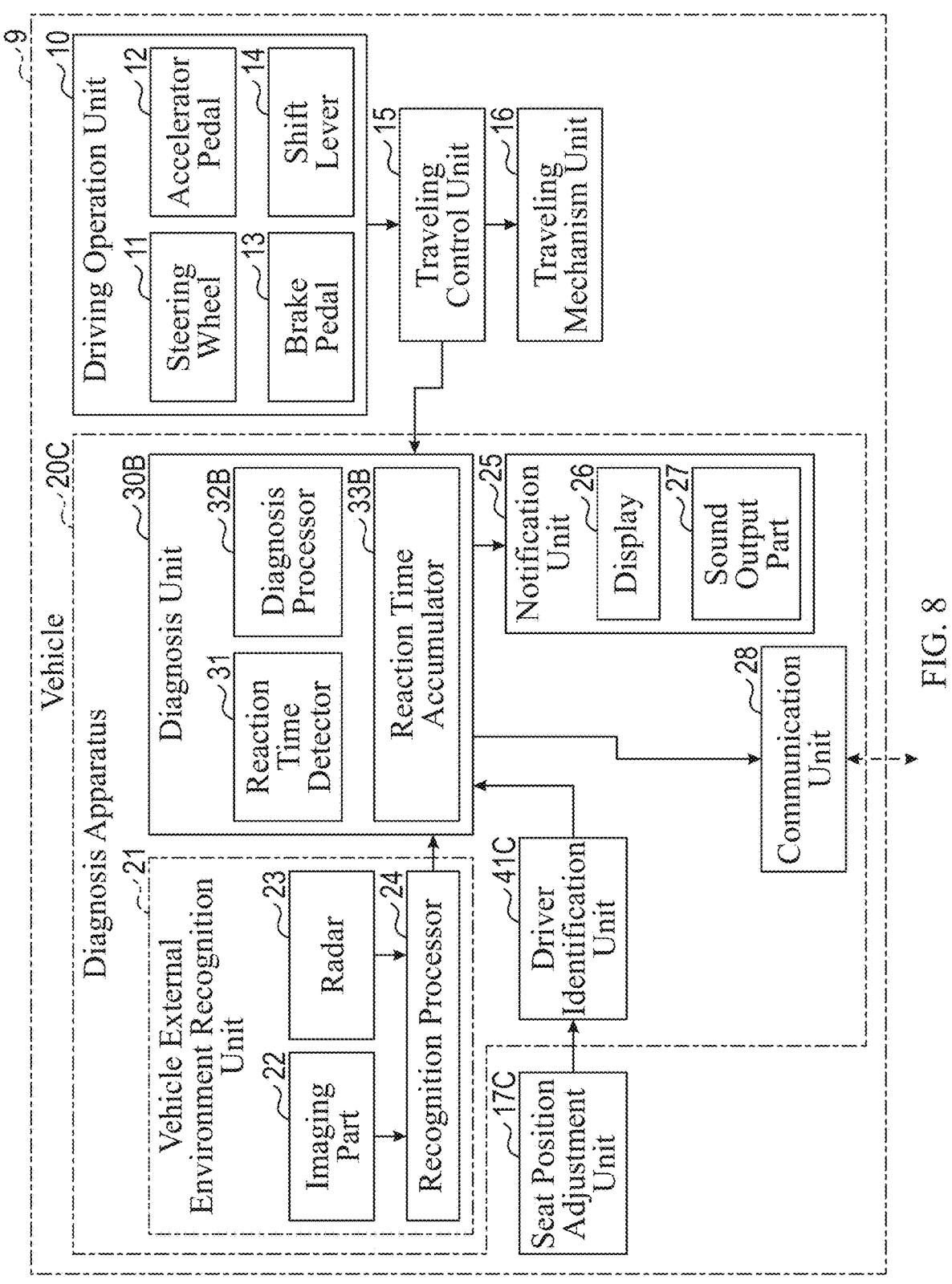
FIG. 8 is a block diagram illustrating a configuration example of a vehicle including a diagnosis apparatus according to another modification example.

In addition, for example, as in a diagnosis apparatus 20C illustrated in FIG. 8, the driver may be identified by an easier method. The vehicle 9 including the diagnosis apparatus 20C includes a seat position adjustment unit 17C. The seat position adjustment unit 17C is configured to adjust a seat position of a seat of the driver in a front-rear direction. The seat position adjustment unit 17C includes a memory, and holds, for example, the seat positions of multiple drivers who can drive the vehicle 9. In other words, in general, the seat position is adjusted based on the driver's physical feature or preference. Hence, the seat position adjustment unit 17C holds, in advance, settings of the seat positions of the multiple drivers who can drive the vehicle 9, and moves the seat of the driver to the held position, based on a seat position selection operation performed by the driver. Specifically, when the driver selects a first setting, the seat position adjustment unit 17C moves the seat of the driver to the seat position indicated by the first setting, and when the driver selects a second setting, the seat position adjustment unit 17C moves the seat of the driver to the seat position indicated by the second setting. This enables the driver to immediately adjust the seat position to his/her preferred position. In addition, the seat position adjustment unit 17C supplies information regarding the seat position selection operation performed by the driver to the diagnosis apparatus 20C.

The diagnosis apparatus 20C includes a driver identification unit 41C and the diagnosis unit 30B. The driver identification unit 41C is configured to identify the driver, based on the information regarding the driver's selection operation supplied from the seat position adjustment unit 17C. In other words, the seat position is adjusted based on the driver's physical feature or preference, and thus often differs between drivers. Hence, the driver identification unit 41C indirectly identifies the driver based on the seat position selection operation. Further, the identification processor 43 supplies the result of identifying the driver to the diagnosis unit 30B.

Note that the driver identification unit 41C indirectly identifies the driver based on the seat position selection operation performed by the driver in this example, but this is non-limiting. For example, when a key of the vehicle 9 is a so-called smart key that is able to communicate with the vehicle 9 via a radio wave, the driver identification unit 41C may indirectly identify the driver based on an identifier of the smart key.

Thus, in the diagnosis apparatus 20C, even if multiple drivers can drive the vehicle 9, it is possible to suppress influence of a difference between the individual drivers, which makes it possible to enhance the diagnosis accuracy of the health state.

Modification Example 2

Figure 9:
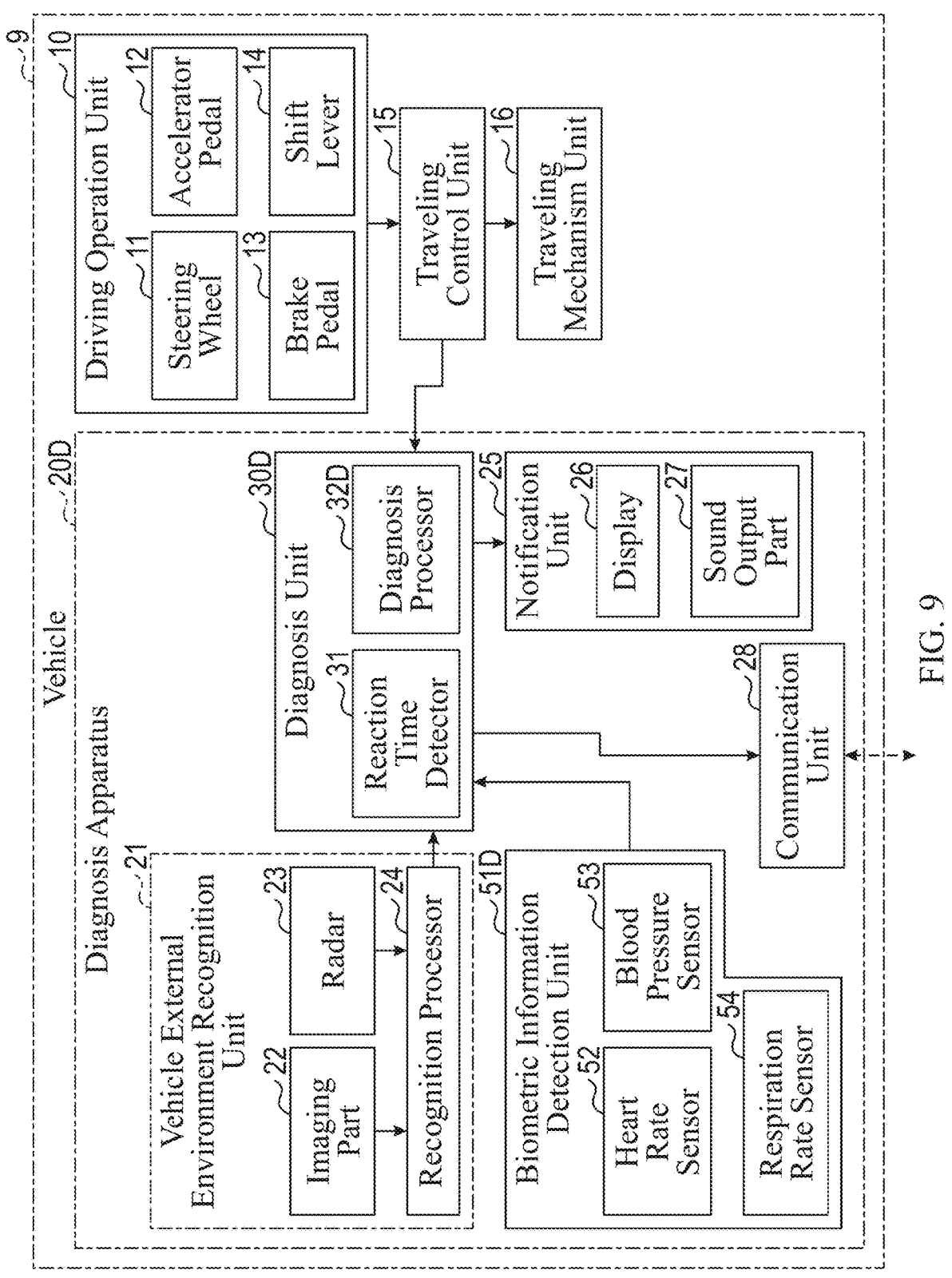
FIG. 9 is a block diagram illustrating a configuration example of a vehicle including a diagnosis apparatus according to another modification example.

In the embodiment described above, the health state of the driver is diagnosed based on the reaction time of the driver, but this is non-limiting. Alternatively, for example, as in a diagnosis apparatus 20D illustrated in FIG. 9, the health state of the driver may be diagnosed further based on biometric information of the driver, in addition to the reaction time of the driver. The diagnosis apparatus 20D includes a biometric information detection unit 51D and a diagnosis unit 30D.

The biometric information detection unit 51D is configured to detect biometric information of the driver. The biometric information detection unit 51D includes a heart rate sensor 52, a blood pressure sensor 53, and a respiration rate sensor 54. The heart rate sensor 52 is configured to detect a heart rate for, for example, one minute of the driver. The blood pressure sensor 53 is configured to detect a blood pressure of the driver. The respiration rate sensor 54 is configured to detect a respiration rate for, for example, one minute of the driver. Note that, without being limited thereto, the biometric information detection unit 51D may detect, for example, various pieces of biometric information, such as a body temperature or a brain wave, of the driver. Here, the biometric information detection unit 51D corresponds to a specific example of a "memory" in the disclosure.

The diagnosis unit 30D includes a diagnosis processor 32D. The diagnosis processor 32D is configured to diagnose the health state of the driver of the vehicle 9, based on the reaction time detected by the reaction time detector 31 and the biometric information detected by the biometric information detection unit 51D. Specifically, the diagnosis processor 32 determines that the driver is likely to be in a poor health state, when the reaction time of the driver is greater than the threshold and, for example, at least one value of the biometric information such as the heart rate, the blood pressure, or the respiration rate falls outside a predetermined range.

Thus, in the diagnosis apparatus 20D, the health state of the driver is diagnosed based on the reaction time detected by the reaction time detector 31 and the biometric information detected by the biometric information detection unit 51D, which makes it possible to enhance the diagnosis accuracy.

Modification Example 3

Figure 10:
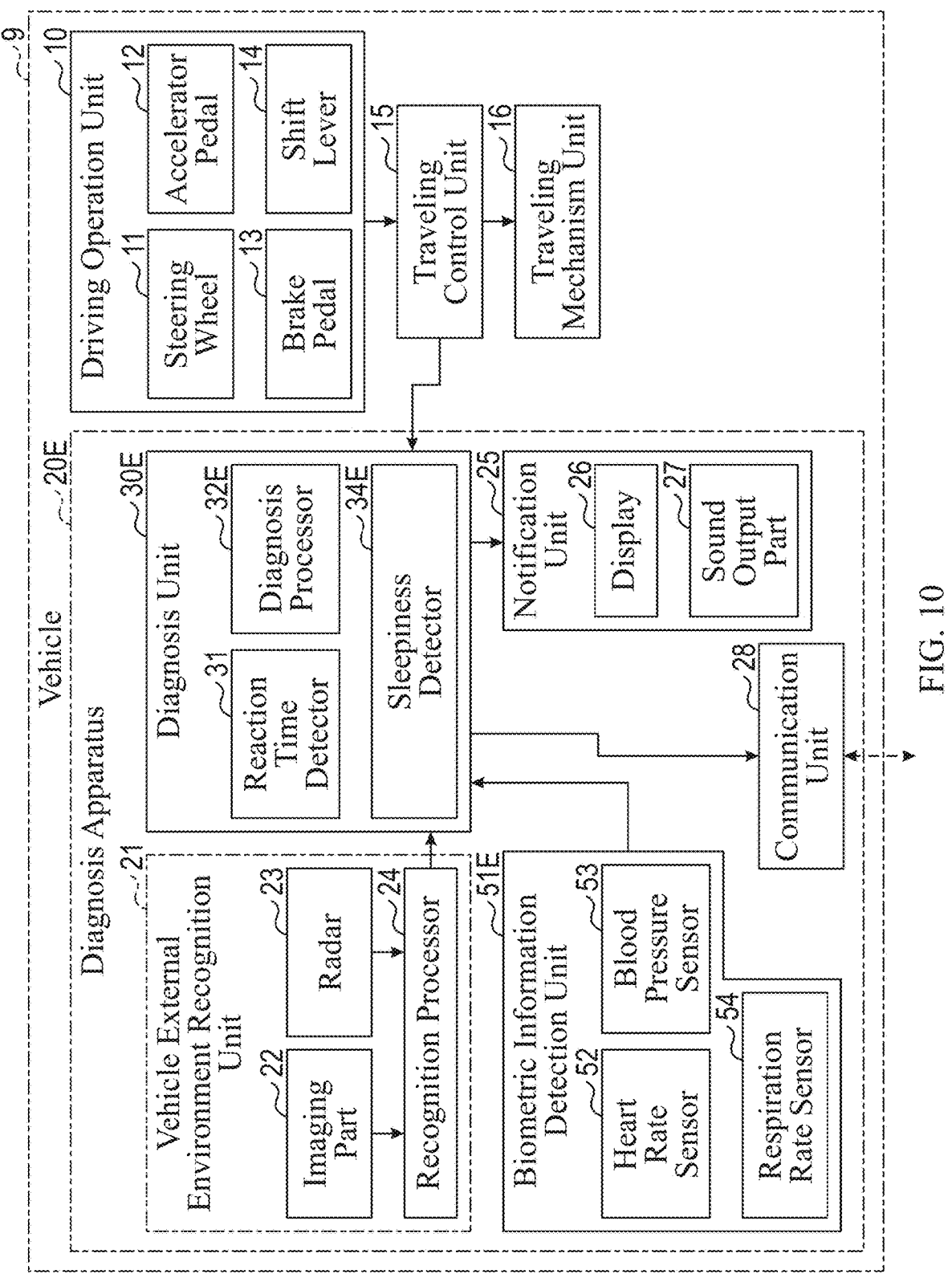
FIG. 10 is a block diagram illustrating a configuration example of a vehicle including a diagnosis apparatus according to another modification example.

In the embodiment described above, the diagnosis processor 32 determines that the driver is likely to be in a poor health state when the reaction time of the driver is longer than the threshold, but this is non-limiting. Alternatively, for example, as in a diagnosis apparatus 20E illustrated in FIG. 10, it may be determined that the driver is likely to be in a poor health state when the reaction time of the driver is greater than the threshold and a sleepiness level of the driver is low. The diagnosis apparatus 20E includes a biometric information detection unit 51E and a diagnosis unit 30E.

The biometric information detection unit 51E is configured to detect biometric information of the driver. The biometric information detection unit 51E includes the heart rate sensor 52, the blood pressure sensor 53, and the respiration rate sensor 54. Note that, without being limited thereto, the biometric information detection unit 51E may detect, for example, various pieces of biometric information, such as a body temperature or a brain wave, of the driver. Here, the biometric information detection unit 51E corresponds to a specific example of a "memory" in the disclosure.

The diagnosis unit 30E includes a sleepiness detector 34E and a diagnosis processor 32E. The sleepiness detector 34E is configured to detect sleepiness of the driver, based on the biometric information detected by the biometric information detection unit 51E. Specifically, the sleepiness detector 34E estimates a sleepiness level that indicates a higher value for greater sleepiness, based on the biometric information detected by the biometric information detection unit 51E.

The diagnosis processor 32E is configured to diagnose the health state of the driver of the vehicle 9, based on the reaction time detected by the reaction time detector 31 and the sleepiness level estimated by the sleepiness detector 34E. Specifically, the diagnosis processor 32E determines that the driver is likely to be in a poor health state when the reaction time of the driver is greater than the threshold and the sleepiness level is lower than a predetermined level.

Thus, in the diagnosis apparatus 20E, even if the reaction time of the driver is longer than the threshold, it is determined that the reaction time is great because of sleepiness when the sleepiness level is equal to or greater than the predetermined level. In this case, the notification unit 25 does not notify the driver that the health state is likely to be poor, and the communication unit 28 does not transmit information indicating that the driver is likely to be in a poor health state to an apparatus external to the vehicle 9. The notification unit 25 may notify the driver that the sleepiness level is high.

In addition, in the diagnosis apparatus 20E, when the reaction time of the driver is greater than the threshold and the sleepiness level is lower than the predetermined level, it is determined that the reaction time is great because of the health state of the driver. In this case, the notification unit 25 notifies the driver that the health state is likely to be poor, and the communication unit 28 transmits information indicating that the driver is likely to be in a poor health state to the apparatus external to the vehicle 9.

Thus, in the diagnosis apparatus 20E, it is estimated whether the driver feels sleepiness based on the biometric information detected by the biometric information detection unit 51E, and it is diagnosed that the health state is poor when the reaction time is longer than the threshold and the driver feels no sleepiness. Thus, when the reaction time is long, it is possible to identify whether its cause is sleepiness or the health state, which makes it possible to enhance the diagnosis accuracy.

Modification Example 4

In the embodiment described above, both the notification unit 25 and the communication unit 28 are provided, but this is non-limiting. Alternatively, only either of the notification unit 25 and the communication unit 28 may be provided.

Modification Example 5

Figure 11:
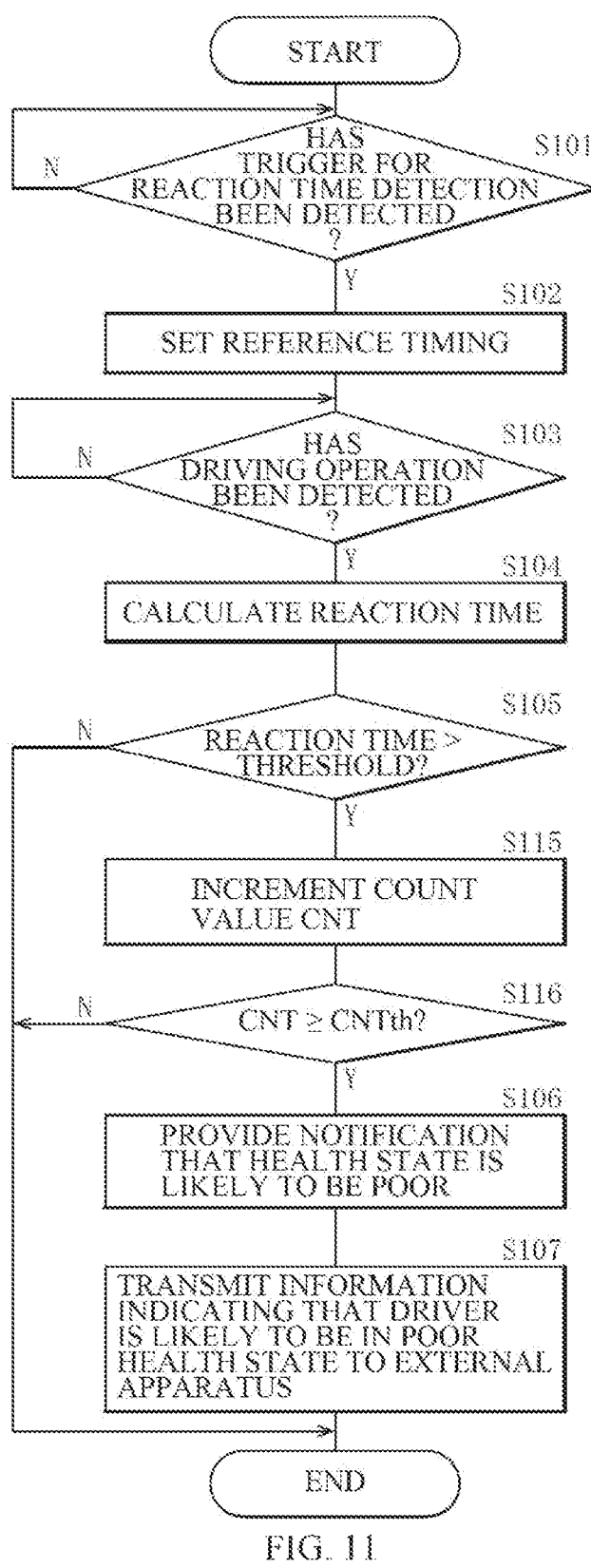
FIG. 11 is a flowchart illustrating an operation example of a diagnosis apparatus according to another modification example.

In the embodiment described above, as illustrated in FIG. 4, the diagnosis processor 32 checks whether the reaction time is longer than the threshold in step S105, and determines that the driver is likely to be in a poor health state when the reaction time is longer than the threshold, but this is non-limiting. Alternatively, for example, as illustrated in FIG. 11, the diagnosis processor 32 may determine that the driver is likely to be in a poor health state, when a situation in which the reaction time is longer than the threshold is repeated a predetermined number of times.

In this example, the diagnosis processor 32 of the diagnosis unit 30 checks whether the reaction time calculated in step S104 is longer than the threshold (step S105). If the reaction time is longer than the threshold in step S105 ("Y" in step S105), the diagnosis processor 32 increments a count value CNT (step S115). Further, the diagnosis processor 32 checks whether the count value CNT is equal to or greater than a predetermined value CNTth (step S116). If the count value CNT is less than the predetermined value CNTth ("N" in step S116), this process ends. If the count value CNT is equal to or greater than the predetermined value CNTth ("Y" in step S116), the notification unit 25 notifies the driver or the passenger that the driver is likely to be in a poor health state (step S106), and the communication unit 28 transmits information indicating that the driver is likely to be in a poor health state to an external apparatus (step S107). Note that the count value CNT is reset, for example, each time the vehicle 9 is activated.

Thus, in the diagnosis apparatus 20, the notification unit 25 and the communication unit 28 are able to operate when the situation in which the reaction time is longer than the threshold is repeated the predetermined number of times. Hence, for example, when the driver looks away and the reaction time of the driver is longer than the threshold only once, the notification unit 25 and the communication unit 28 do not operate. This makes it possible to suppress excessive execution of notification and communication, making it possible to enhance convenience.

In this example, the diagnosis processor 32 determines that the driver is likely to be in a poor health state when the situation in which the reaction time is longer than the threshold is repeated the predetermined number of times, but this is non-limiting. Alternatively, the diagnosis processor 32 may determine that the driver is likely to be in a poor health state, for example, when the situation in which the reaction time is longer than the threshold is successively repeated a predetermined number of times. In other words, the diagnosis unit 30 checks whether the reaction time is longer than the threshold each time a trigger for reaction time detection is detected in step S101; the notification unit 25 and the communication unit 28 may operate when the situation in which the reaction time is longer than the threshold is successively repeated the predetermined number of times. For example, when the driver is in a poor health state, it is highly likely that the situation in which the reaction time is longer than the threshold is successively repeated. Hence, it is possible to enhance the diagnosis accuracy of the health state of the driver, by determining that the driver is likely to be in a poor health state when the situation in which the reaction time is longer than the threshold is successively repeated the predetermined number of times.

Other Modification Examples

Two or more of these modification examples may be combined.

Although the invention has been described with reference to the embodiments and modification examples described above, the invention is not limited thereto, and various modifications may be made.

For example, in the embodiments described above, the health state of the driver is diagnosed by comparing the reaction time with the threshold, but this is non-limiting. Alternatively, for example, the health state of the driver may be diagnosed based on the reaction time, using a technique of machine learning. Specifically, the diagnosis processor may diagnose the health state of the driver, for example, using a learned model that receives the reaction time as an input and outputs the health state of the driver.

The invention claimed is:

1. A diagnosis apparatus comprising:
   a recognition unit configured to recognize an environment outside a vehicle; and
   a diagnosis unit configured to:
      detect a reaction time of a driver to a recognition target recognized by the recognition unit, based on a driving operation timing in a driving operation unit that receives a driving operation of the driver related to traveling of the vehicle; and
      diagnose a health state of the driver based on the reaction time; and
   a detection unit configured to detect biometric information of the driver, wherein
   the diagnosis unit is configured to:
      estimate whether the driver feels sleepiness based on the biometric information;
      refrain from diagnosing that the health state is poor when the diagnosis unit estimate that the driver feels sleepiness; and
      diagnose the health state of the driver based on the reaction time when the diagnosis unit estimates that the driver feels no sleepiness.

2. The diagnosis apparatus according to claim 1, wherein the diagnosis unit is configured to diagnose the health state based on a plurality of the reaction times corresponding to a plurality of the driving operation timings.

3. The diagnosis apparatus according to claim 1, wherein
   the diagnosis unit comprises a memory configured to accumulate the reaction time of the driver, and
   the diagnosis unit is configured to generate a threshold based on the accumulated reaction time, and diagnose the health state by comparing the reaction time with the threshold.

4. The diagnosis apparatus according to claim 1, further comprising a notification unit configured to notify the driver of information, wherein
   the diagnosis unit is configured to diagnose the health state by comparing the reaction time with a threshold, and
   the notification unit is configured to notify the driver of information corresponding to a result of comparison by the diagnosis unit, when the reaction time is longer than the threshold.

5. The diagnosis apparatus according to claim 1, further comprising a communication unit configured to perform communication with an external apparatus, wherein
   the diagnosis unit is configured to diagnose the health state by comparing the reaction time with a threshold, and the communication unit is configured to transmit information corresponding to a result of comparison by the diagnosis unit to the external apparatus, when the reaction time is longer than the threshold.

6. The diagnosis apparatus according to claim 1, wherein the diagnosis unit is configured to diagnose the health state further based on a result of detecting the biometric information, in addition to the reaction time.

7. The diagnosis apparatus according to claim 4, wherein the notification unit is configured to notify the driver of information indicating that the driver feels sleepiness, when the diagnosis unit estimates that the driver feels sleepiness.

8. The diagnosis apparatus according to claim 1, further comprising a notification unit configured to notify the driver of information, wherein the diagnosis unit is configured to diagnose the health state by comparing the reaction time with a threshold, and the notification unit is configured to notify the driver of information corresponding to a result of comparison by the diagnosis unit, when the reaction time is longer than the threshold is repeated a predetermined number of times.

9. The diagnosis apparatus according to claim 1, further comprising a communication unit configured to perform communication with an external apparatus, wherein the diagnosis unit is configured to diagnose the health state by comparing the reaction time with a threshold, and the communication unit is configured to transmit information corresponding to a result of comparison by the diagnosis unit to the external apparatus, when the reaction time is longer than the threshold is repeated a predetermined number of times.

10. A diagnosis apparatus comprising:

a recognition unit configured to recognize an environment outside a vehicle; and a diagnosis unit configured to:

detect a reaction time of a driver to a recognition target recognized by the recognition unit, based on a driving operation timing in a driving operation unit that receives a driving operation of the driver related to traveling of the vehicle; and diagnose a health state of the driver based on the reaction time; and a detection unit configured to detect biometric information of the driver, wherein the recognition unit is configured to recognize a curve in front of the vehicle, the diagnosis unit is configured to detect the reaction time to the curve, based on a steering operation timing of the driver, the diagnosis unit comprises a memory configured to accumulate reaction times of the driver, and the diagnosis unit is further configured to:

generate a threshold based on the accumulated reaction times, and diagnose the health state by comparing the reaction time with the threshold;

diagnose the health state further based on a result of detecting the biometric information, in addition to the reaction time;

estimate a sleepiness level of the driver based on the biometric information; and diagnose that the driver is in a poor health state only when the reaction time exceeds the threshold and the sleepiness level is below a predetermined level.

11. The diagnosis apparatus according to claim 10, wherein the diagnosis unit is configured to diagnose the health state based on the reaction times accumulated in the memory corresponding to driving operation timings.

12. The diagnosis apparatus according to claim 10, further comprising a notification unit configured to notify the driver of information, wherein the diagnosis unit is configured to diagnose the health state by comparing the reaction time with the threshold, and the notification unit is configured to notify the driver of information corresponding to a result of comparison by the diagnosis unit, when the reaction time is longer than the threshold.

13. The diagnosis apparatus according to claim 10, further comprising a communication unit configured to perform communication with an external apparatus, wherein the diagnosis unit is configured to diagnose the health state by comparing the reaction time with the threshold, and the communication unit is configured to transmit information corresponding to a result of comparison by the diagnosis unit to the external apparatus, when the reaction time is longer than the threshold.

* * * * *